US011458616B2

(12) United States Patent
Kurokawa

(10) Patent No.: US 11,458,616 B2
(45) Date of Patent: Oct. 4, 2022

(54) ROBOT

(71) Applicant: Seiko Epson Corporation, Tokyo (JP)

(72) Inventor: Junichi Kurokawa, Azumino (JP)

(73) Assignee: SEIKO EPSON CORPORATION

( * ) Notice: Subject to any disclaimer, the term of this patent is extended or adjusted under 35 U.S.C. 154(b) by 119 days.

(21) Appl. No.: 16/912,744

(22) Filed: Jun. 26, 2020

(65) Prior Publication Data

US 2020/0406451 A1 Dec. 31, 2020

(30) Foreign Application Priority Data

Jun. 27, 2019 (JP) .............................. JP2019-119690

(51) Int. Cl.
*B25J 13/08* (2006.01)
*B25J 9/04* (2006.01)
*B25J 9/00* (2006.01)
*B25J 9/12* (2006.01)
*B25J 9/16* (2006.01)

(52) U.S. Cl.
CPC ............... *B25J 9/04* (2013.01); *B25J 9/0009* (2013.01); *B25J 13/085* (2013.01); *B25J 9/12* (2013.01); *B25J 9/161* (2013.01); *B25J 13/088* (2013.01)

(58) Field of Classification Search
CPC ... B25J 9/04; B25J 9/009; B25J 13/085; B25J 13/088
See application file for complete search history.

(56) References Cited

U.S. PATENT DOCUMENTS

| 9,289,898 B2 * | 3/2016 | Ono ......................... B25J 18/04 |
| 2018/0133902 A1 | 5/2018 | Inoue et al. |
| 2019/0160688 A1 * | 5/2019 | Fujita ..................... B25J 13/089 |
| 2019/0248006 A1 * | 8/2019 | Takahashi ............ G05B 19/421 |

FOREIGN PATENT DOCUMENTS

JP 2018-080941 A 5/2018

* cited by examiner

*Primary Examiner* — Randell J Krug
(74) *Attorney, Agent, or Firm* — Harness, Dickey & Pierce, P.L.C.

(57) ABSTRACT

A robot includes a base, a robot arm having a first arm coupled to the base and rotating about a first axis, and a force detection unit provided in the base and detecting a force acting on the base or the robot arm, wherein the first arm is coupled to the base in a position shifted from a first center line passing through a center of the base and being parallel to the first axis, and a second center line passing through a center of the force detection unit and being parallel to the first axis is closer to the first axis than the first center line.

6 Claims, 7 Drawing Sheets

ROBOT

The present application is based on, and claims priority from JP Application Serial Number 2019-119690, filed Jun. 27, 2019, the disclosure of which is hereby incorporated by reference herein in its entirety.

BACKGROUND

1. Technical Field

The present disclosure relates to a robot.

2. RELATED ART

Recently, in factories, due to labor cost rise and labor shortage, work manually performed in the past has been increasingly automated by various robots and robot peripherals. The various robots include e.g. bases, arms supported by the bases, and force sensors as shown in JP-A-2018-080941. In the robots, the arms are controlled based on detection results of the force sensors.

In the robot disclosed in JP-A-2018-080941, the force sensor is provided below the base. Accordingly, load of the base and the arm is applied onto the force sensor. During actuation of the robot, for example, when an external force is applied to the arm, the force is transmitted to the force sensor via the arm and the base. The force may be detected and the arm may be controlled based on the detection result.

However, when the arm is coupled to a position shifted from a center line of the base, in the configuration as shown in JP-A-2018-080941, i.e., the configuration in which the center axis of the force sensor and the center axis of the base coincide, torque under the arm's weight is constantly applied to the force sensor. The detection accuracy of the force sensor may be lower depending on the magnitude of the torque.

SUMMARY

The present disclosure can be implemented as follows.

A robot according to an application example includes a base, a robot arm having a first arm coupled to the base and rotating about a first axis, and a force detection unit provided in the base and detecting a force acting on the base or the robot arm, wherein the first arm is coupled to the base in a position shifted from a first center line passing through a center of the base and being parallel to the first axis, and a second center line passing through a center of the force detection unit and being parallel to the first axis is closer to the first axis than the first center line.

DESCRIPTION OF EXEMPLARY EMBODIMENTS

As below, a robot according to the present disclosure will be explained in detail based on preferred embodiments shown in the accompanying drawings.

First Embodiment

Figure 1:
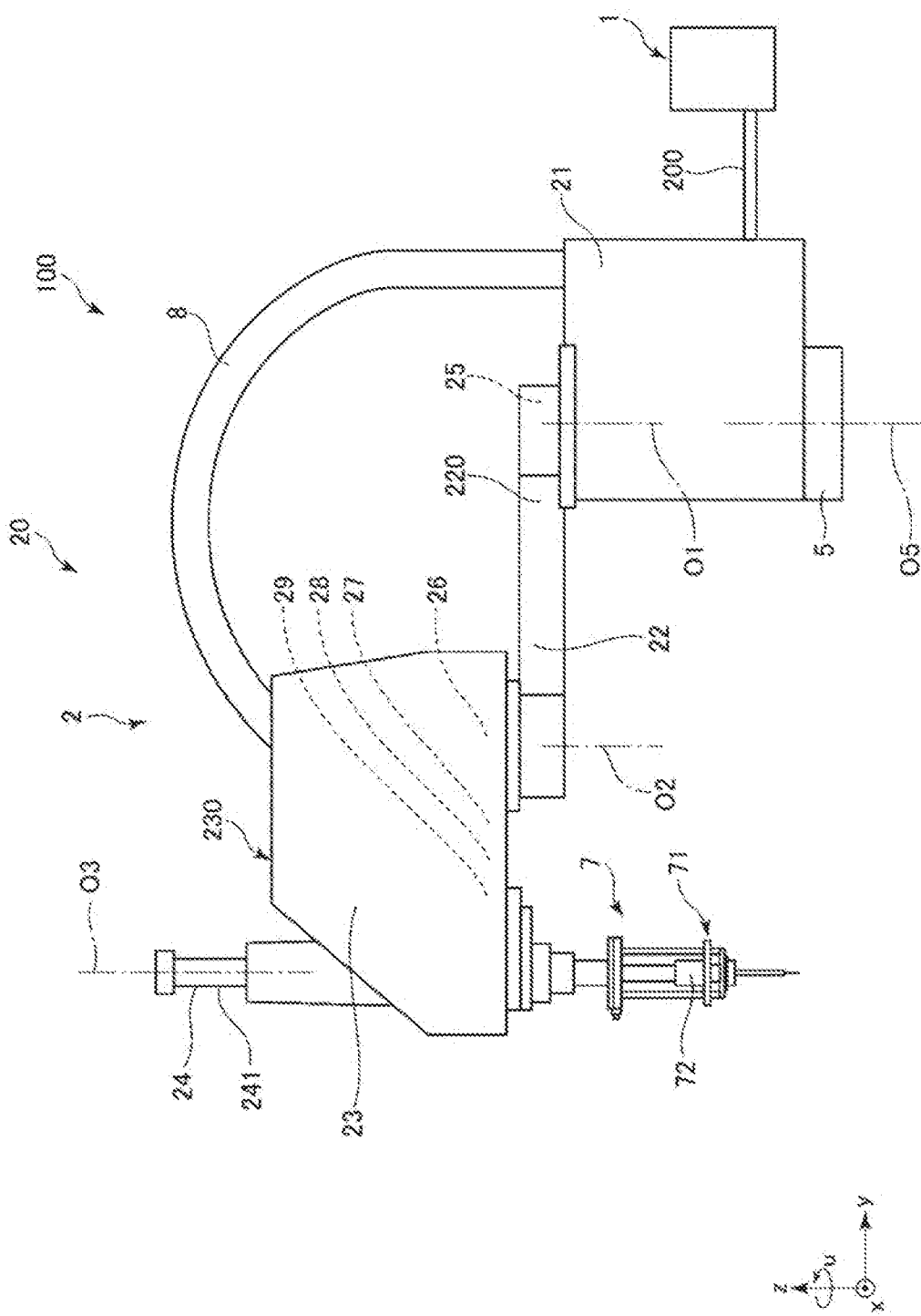
FIG. 1 is a side view showing a first embodiment of a robot system including a robot according to the present disclosure.
Figure 2:
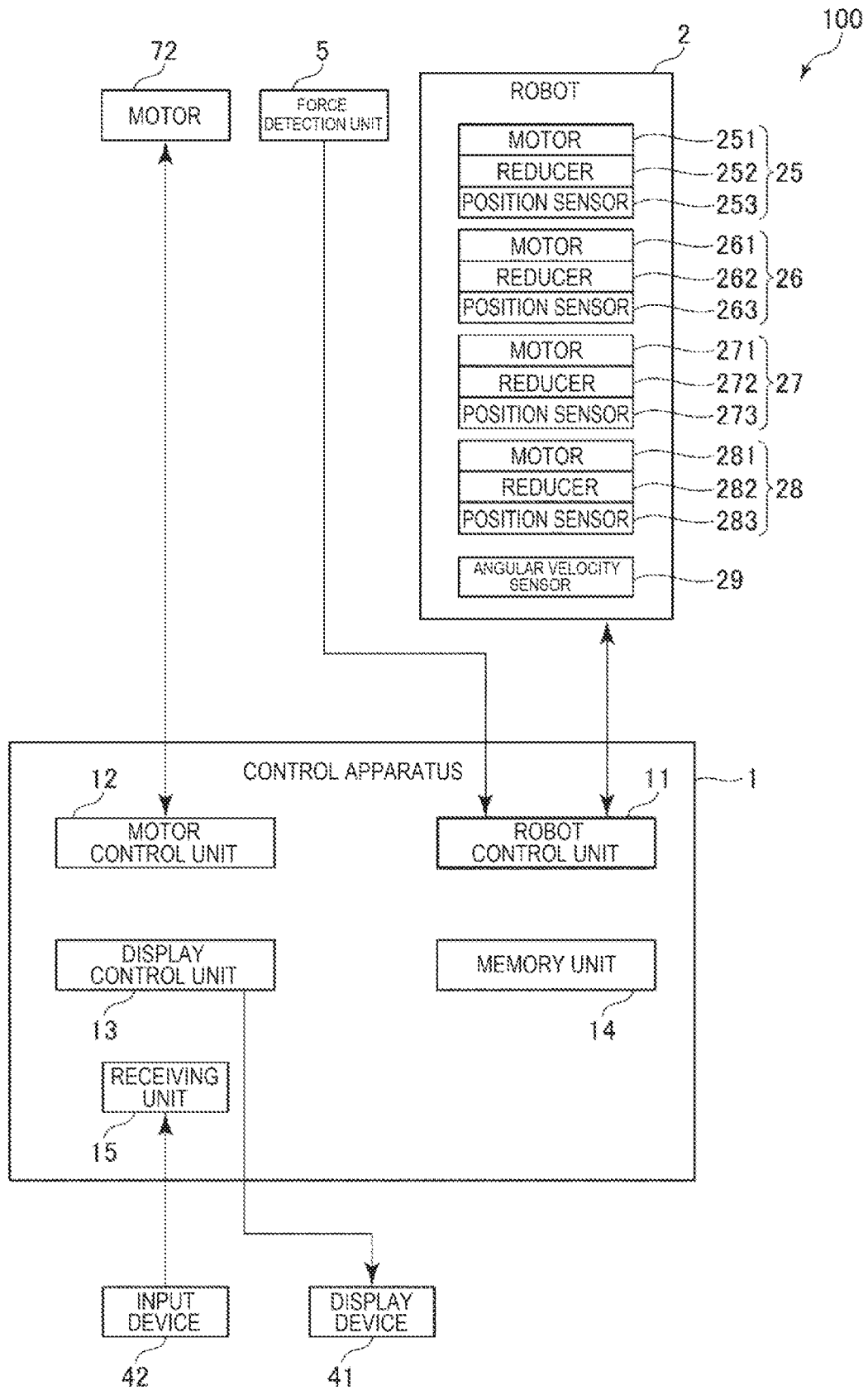
FIG. 2 is a block diagram of the robot system shown in FIG. 1.
Figure 3:
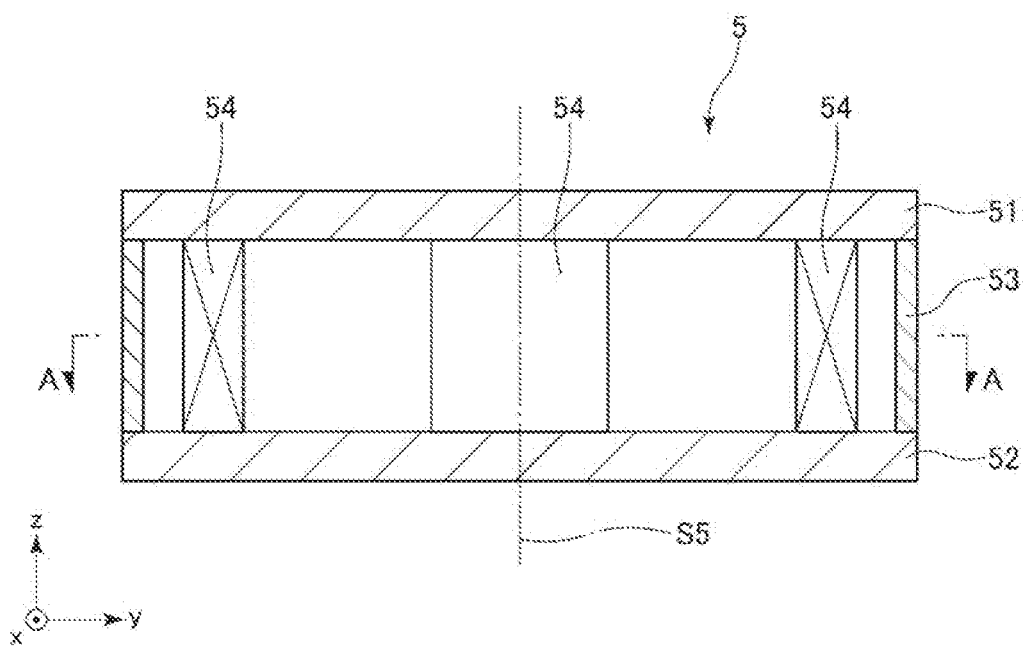
FIG. 3 is a side view of a force detection unit shown in FIG. 1.
Figure 4:
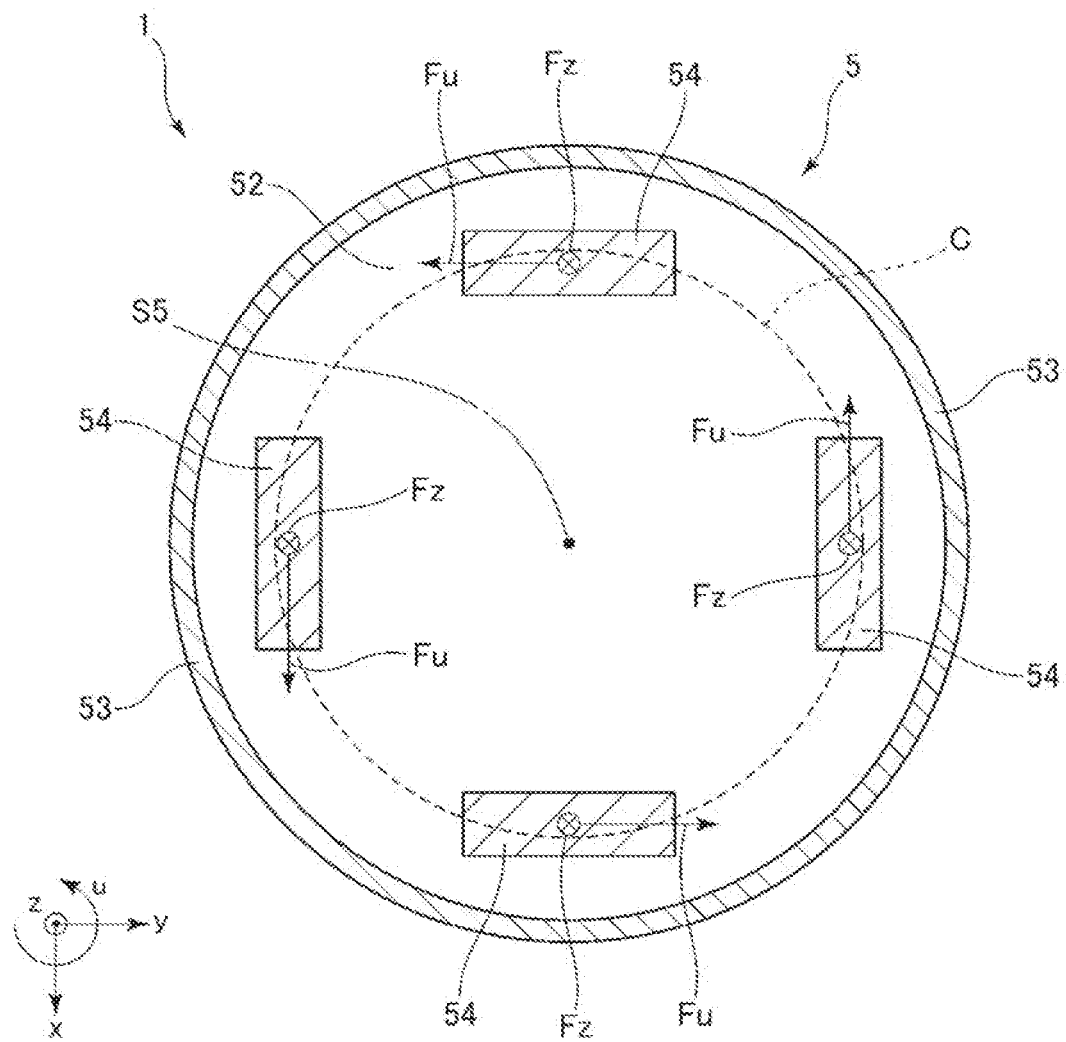
FIG. 4 is a sectional view along line A-A in FIG. 3.
Figure 5:
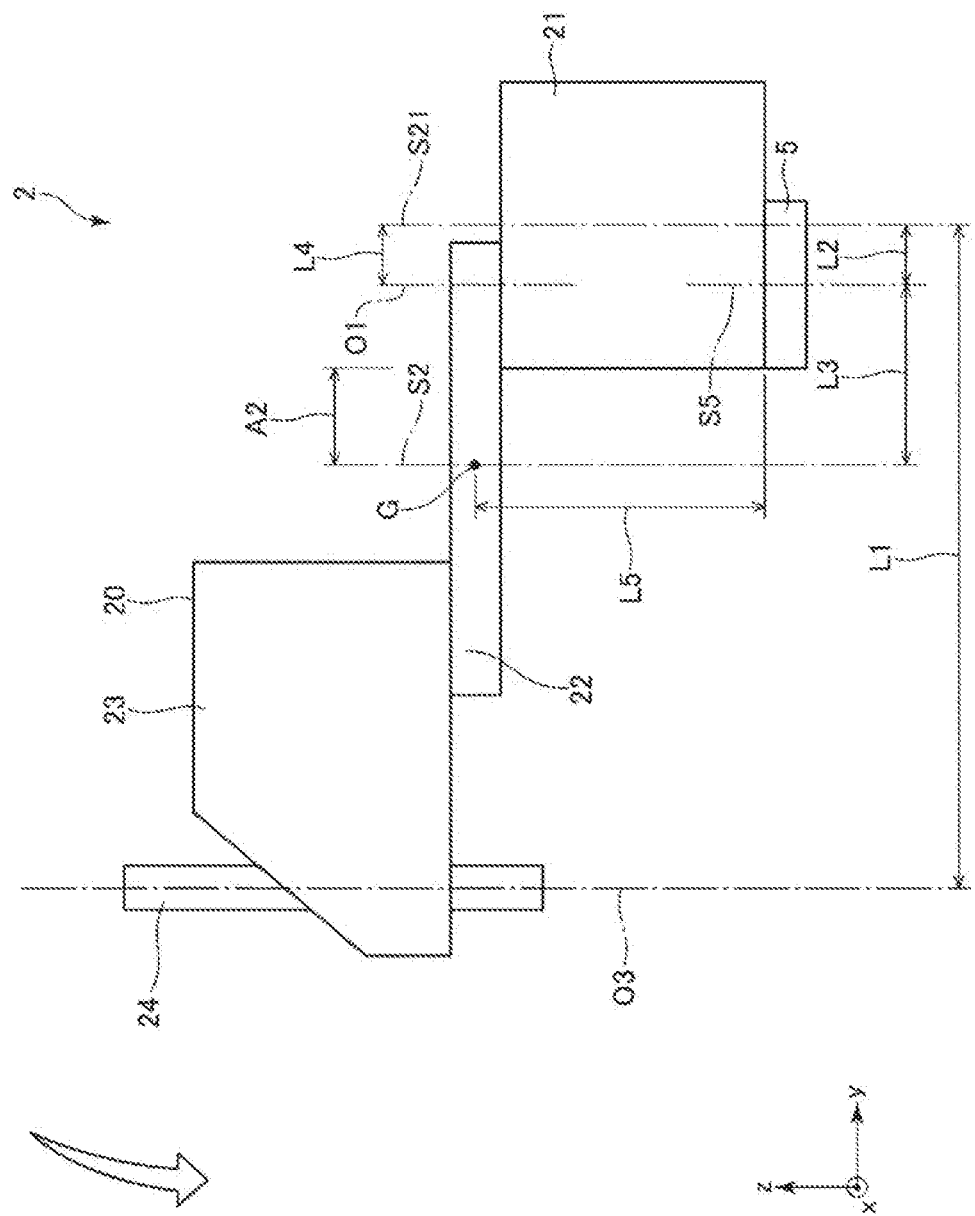
FIG. 5 is a schematic diagram of the robot shown in FIG. 1.

FIG. 1 is the side view showing the first embodiment of the robot system including the robot according to the present disclosure. FIG. 2 is the block diagram of the robot system shown in FIG. 1. FIG. 3 is the side view of the force detection unit shown in FIG. 1. FIG. 4 is the sectional view along line A-A in FIG. 3. FIG. 5 is the schematic diagram of the robot shown in FIG. 1.

In FIGS. 1 and 3 to 7, for convenience of explanation, an x-axis, a y-axis, and a z-axis are shown as three axes orthogonal to one another. Hereinafter, directions parallel to the x-axis are also referred to as "x-axis directions", directions parallel to the y-axis are also referred to as "y-axis directions", and directions parallel to the z-axis are also referred to as "z-axis directions". Further, hereinafter, the head sides of the respective arrows are referred to as "+(plus)" and tail sides are referred to as "− (minus)", a direction parallel to the +x-axis direction is also referred to as "+x-axis direction", a direction parallel to the −x-axis direction is also referred to as "−x-axis direction", a direction parallel to the +y-axis direction is also referred to as "+y-axis direction", a direction parallel to the −y-axis direction is also referred to as "−y-axis direction", a direction parallel to the +z-axis direction is also referred to as "+z-axis direction", and a direction parallel to the −z-axis direction is also referred to as "−z-axis direction". Furthermore, a direction about the z-axis and a direction about an axis parallel to the z-axis are also referred to as "u-axis directions".

Hereinafter, for convenience of explanation, the +z-axis direction in FIG. 1, i.e., the upside is also referred to as "upper" or "above" and the −z-axis direction, i.e., the downside is also referred to as "lower" or "below". Further, regarding a robot arm 20, a side of a base 21 in FIG. 1 is referred to as "proximal end" and the opposite side, i.e., a side of an end effector 7 is referred to as "distal end". Furthermore, the z-axis directions in FIG. 1, i.e., upward and downward directions are referred to as "vertical directions" and the x-axis directions and the y-axis directions, i.e., leftward and rightward directions are referred to as "horizontal directions".

A robot system 100 shown in FIGS. 1 and 2 is an apparatus used for work of e.g. holding, transport, assembly, inspection, etc. of works including electronic components and electronic apparatuses. The robot system 100 includes a control apparatus 1, a robot 2, and the end effector 7. Additionally, the robot system 100 includes a display device 41, an input device 42, etc.

The control apparatus 1 is placed in a position different from that of the robot 2, i.e., outside of the robot 2. Further, in the illustrated configuration, the robot 2 and the control apparatus 1 are electrically coupled (hereinafter, also simply referred to as "coupled") by a cable 200, however, not limited thereto the cable 200 may be omitted for wireless communication. That is, the robot 2 and the control apparatus 1 may be connected in wired communication or connected in wireless communication. Further, the control apparatus 1 may be provided inside of the base 21 of the robot 2.

In the illustrated configuration, the robot 2 is a horizontal articulated robot, i.e., a SCARA robot.

As shown in FIG. 1, the robot 2 includes the base 21, a first arm 22, a second arm 23, a third arm 24 as a working head, and a force detection unit 5. The first arm 22, the second arm 23, and the third arm 24 form the robot arm 20.

Further, the robot 2 includes a drive unit 25 that rotates the first arm 22 relative to the base 21, a drive unit 26 that rotates the second arm 23 relative to the first arm 22, a u-drive unit 27 that rotates a shaft 241 of the third arm 24 relative to the second arm 23, a z-drive unit that moves the shaft 241 in the z-axis directions relative to the second arm 23, and an angular velocity sensor 29.

As described above, the robot 2 includes the base 21 rotatably supporting the robot arm 20, and the robot arm 20 includes the first arm 22 and the second arm 23 located at the distal side of the first arm 22 with respect to the base 21. Thereby, the movable range of the robot arm 20 may be increased.

As shown in FIGS. 1 and 2, the drive unit 25 is provided within a housing 220 of the first arm 22, and has a motor 251 that generates a driving force, a reducer 252 that reduces the driving force of the motor 251, and a position sensor 253 that detects the rotation angle of the rotation shaft of the motor 251 or the reducer 252.

The drive unit 26 is provided within a housing 230 of the second arm 23, and has a motor 261 that generates a driving force, a reducer 262 that reduces the driving force of the motor 261, and a position sensor 263 that detects the rotation angle of the rotation shaft of the motor 261 or the reducer 262.

The u-drive unit 27 is provided within the housing 230 of the second arm 23, and has a motor 271 that generates a driving force, a reducer 272 that reduces the driving force of the motor 271, and a position sensor 273 that detects the rotation angle of the rotation shaft of the motor 271 or the reducer 272.

The z-drive unit 28 is provided within the housing 230 of the second arm 23, and has a motor 281 that generates a driving force, a reducer 282 that reduces the driving force of the motor 281, and a position sensor 283 that detects the rotation angle of the rotation shaft of the motor 281 or the reducer 282.

As the motor 251, the motor 261, the motor 271, and the motor 281, e.g. servo motors such as AC servo motors or DC servo motors may be used.

As the reducer 252, the reducer 262, the reducer 272, and the reducer 282, e.g. planet-gear reducers, wave gearings, or the like may be used. As the position sensor 253, the position sensor 263, the position sensor 273, and the position sensor 283, e.g. angle sensors may be used.

The drive unit 25, the drive unit 26, the u-drive unit 27, and the z-drive unit 28 are respectively coupled to corresponding motor drivers (not shown) and controlled by a robot control unit 11 of the control apparatus 1 via the motor drivers.

As shown in FIG. 1, the angular velocity sensor 29 is provided inside of the second arm 23. Accordingly, the angular velocity of the second arm 23 may be detected. The control apparatus 1 performs control of the robot 2 based on information of the detected angular velocity.

The base 21 is fixed to e.g. a floor surface (not shown) by bolts or the like. The first arm 22 is coupled to the upper end portion of the base 21. The first arm 22 is rotatable about a first axis O1 along the vertical directions relative to the base 21. When the drive unit 25 that rotates the first arm 22 is driven, the first arm 22 rotates about the first axis O1 within the horizontal plane relative to the base 21. The position sensor 253 may detect the amount of rotation of the first arm 22 relative to the base 21.

The second arm 23 is coupled to the distal end portion of the first arm 22. The second arm 23 is rotatable about a second axis O2 along the vertical directions relative to the first arm 22. The axial direction of the first axis O1 and the axial direction of the second axis O2 are the same. That is, the second axis O2 is parallel to the first axis O1. When the drive unit 26 that rotates the second arm 23 is driven, the second arm 23 rotates about the second axis O2 within the horizontal plane relative to the first arm 22. The position sensor 263 may detect the amount of drive, specifically, the amount of rotation of the second arm 23 relative to the first arm 22.

The third arm 24 is placed and supported in the distal end portion of the second arm 23. The third arm 24 has the shaft 241. The shaft 241 is rotatable about a third axis O3 along the vertical directions relative to the second arm 23 and movable in the upward and downward directions. The shaft 241 is an arm at the most distal end of the robot arm 20.

When the u-drive unit 27 that rotates the shaft 241 is driven, the shaft 241 forwardly and reversely rotates about the z-axis, that is, turns. The position sensor 273 may detect the amount of rotation of the shaft 241 relative to the second arm 23.

When the z-drive unit 28 that moves the shaft 241 in the z-axis directions is driven, the shaft 241 moves in the upward and downward directions, i.e., the z-axis directions. The position sensor 283 may detect the amount of movement of the shaft 241 in the z-axis directions relative to the second arm 23.

As described above, the robot arm 20 has the first arm 22, the second arm 23 coupled to the first arm 22 at an opposite side to the base 21 and rotating about the second axis O2 parallel to the first axis O1, and the third arm 24 supported by the second arm 23 and moving along an axial direction of the third axis O3 in a position different from that of the second axis O2 in parallel to the second axis O2. The movable range on the xy-plane may be sufficiently secured by the first arm 22 and the second arm 23, and actuation in the z-axis directions may be performed by the third arm 24.

Various end effectors are detachably coupled to the distal end portion of the shaft 241. The end effectors are not particularly limited to, but include e.g. an end effector that grips an object to be transported, an end effector that processes a workpiece, an end effector used for an inspection, etc. In the embodiment, the end effector is detachably coupled. The end effector 7 will be described later in detail.

Note that the end effector 7 is not a component element of the robot 2 in the embodiment, however, a part or all of the end effector 7 may be a component element of the robot 2. Further, the end effector 7 is not a component element of the robot arm 20 in the embodiment, however, a part or all of the end effector 7 may be a component element of the robot arm 20.

As shown in FIG. 1, the end effector 7 has an attachment portion 71 attached to the shaft 241, a motor 72 provided in the attachment portion 71, and a screw limit gauge 3 detachably and coaxially attached to the rotation shaft of the motor 72. The end effector 7 is detachably coupled to the distal end portion of the shaft 241.

The motor 72 is not particularly limited, but e.g. a servo motor such as an AC servo motor or DC servo motor, stepping motor, or the like is used.

Further, the end effector 7 has an angle sensor (not shown) that detects the rotation angle of the rotation shaft of the motor 72, and the angle sensor may detect the rotation angle of the rotation shaft of the motor 72.

In the end effector 7, compared to a case where a power transmission mechanism including a gear and a belt intervenes between the rotation shaft of the motor 72 and the screw limit gauge 3, lowering of the rotation accuracy due to backlash may be suppressed.

In the embodiment, the end effector 7 is detachable from the robot arm 20, however, not limited thereto, for example, the end effector 7 may be undetachable from the robot arm 20.

Next, the force detection unit 5 will be explained.

As shown in FIGS. 1 and 3, the force detection unit 5 detects a force applied to the robot 2, i.e., a force applied to the robot arm 20 and the base 21. The force detection unit 5 is provided under the base 21, i.e., at the −z-axis side and supports the base 21 from underneath. Accordingly, a load of the weights of the robot arm 20 and the base 21 is applied onto the force detection unit 5.

Further, as shown in FIG. 3, the force detection unit 5 is a member in a cylindrical outer shape having a first plate 51, a second plate 52, a tubular portion 53 placed between the first plate 51 and the second plate 52, and a plurality of, in the embodiment, four elements 54. The four elements 54 are sandwiched between the first plate 51 and the second plate 52. The number of the elements 54 is not limited to that, but may be three or less or five or more.

The first plate 51 and the second plate 52 have circular disc shapes and are sequentially placed from the +z-axis side. Note that the shapes of the first plate 51 and the second plate 52 in a plan view are not limited to the circular shapes, but may be any shapes.

The tubular portion 53 has a cylindrical shape in the embodiment and has a function of protecting the elements 54.

The respective elements 54 are placed at equal intervals to form a circular shape. Thereby, forces applied to the respective elements 54 may be as uniform as possible and the forces may be accurately detected. Here, in this specification, a line passing through the center of a circle C on which the respective elements 54 are placed and being parallel to the z-axis, i.e., the first axis O1 is referred to as "center line S5". In the embodiment, the center of the force detection unit 5 is the center of the circle C on which the respective elements 54 are placed. However, when the respective elements 54 are not circularly placed, the geometric center of a figure with the respective elements 54 as vertices is referred to as the center of the force detection unit 5.

As the respective elements 54, elements formed using e.g. piezoelectric materials such as quartz crystal and outputting electric charge by application of external force may be employed. The control apparatus 1 may convert the electric charge according to an amount thereof into an external force applied to the end effector 7. Such a piezoelectric material can adjust a direction to generate electric charge when an external force is applied according to the direction in which the element is placed.

In the embodiment, as shown in FIG. 4, the respective elements 54 may detect forces Fz of components in the vertical directions and forces Fu about the z-axis, i.e., in u-axis directions. That is, the force detection unit 5 detects the forces Fz in the axial direction of the third axis O3.

Thereby, the work of moving the shaft 241 along the z-axis directions may be performed more accurately.

In the robot 2, the control apparatus 1 is coupled via the cable 200.

As shown in FIG. 2, the control apparatus 1 includes the robot control unit 11, a motor control unit 12 (end effector control unit), a display control unit 13, a memory unit 14, and a receiving unit 15, and respectively controls driving of the respective parts of the robot system 100 including the robot 2, the motor 72 of the end effector 7, and the display device 41.

Further, the control apparatus 1 is configured to be respectively communicable among the robot control unit 11, the motor control unit 12, the display control unit 13, the memory unit 14, and the receiving unit 15. That is, the robot control unit 11, the motor control unit 12, the display control unit 13, the memory unit 14, and the receiving unit 15 are coupled to one another in wired or wireless communication.

The robot control unit 11 controls driving of the robot 2, i.e., driving of the robot arm 20 etc. The robot control unit 11 is a computer in which programs of OS etc. are installed. The robot control unit 11 has e.g. a CPU as a processor, a RAM, and a ROM in which the programs are stored. Further, the function of the robot control unit 11 may be realized by e.g. execution of various programs using the CPU.

The motor control unit 12 controls driving of the motor 72. The motor control unit 12 is a computer in which programs of OS etc. are installed. The motor control unit 12 has e.g. a CPU as a processor, a RAM, and a ROM in which the programs are stored. Further, the function of the motor control unit 12 may be realized by e.g. execution of various programs using the CPU.

The display control unit 13 has a function of displaying various screens such as windows, characters, etc. on the display device 41. That is, the display control unit 13 controls driving of the display device 41. The function of the display control unit 13 may be realized by e.g. a GPU or the like.

The memory unit 14 has a function of storing various kinds of information including data and programs. The memory unit 14 stores control programs etc. The function of the memory unit 14 may be realized by the so-called external memory device such as a ROM.

The receiving unit 15 has a function of receiving input from the input device 42. The function of the receiving unit 15 may be realized using e.g. an interface circuit. Note that, for example, when a touch panel is used, the receiving unit 15 has a function as an input sensing unit that senses contact of a user's finger with the touch panel or the like.

The display device 41 includes a monitor (not shown) formed using e.g. a liquid crystal display, EL display, or the like, and has a function of displaying various images including various screens such as windows, characters, etc.

The input device 42 includes e.g. a mouse, keyboard, etc. Therefore, the user operates the input device 42, and thereby, may give instructions of various kinds of processing etc. to the control apparatus 1.

Specifically, the user may give instructions to the control apparatus 1 by an operation of clicking the various screens such as windows displayed on the display device 41 with the mouse of the input device 42 and an operation of inputting characters, numerals, etc. with the keyboard of the input device 42.

Note that, in the embodiment, in place of the display device 41 and the input device 42, a display input device serving as both the display device 41 and the input device 42 may be provided. As the display input device, e.g. a touch panel such as an electrostatic touch panel or pressure-sensitive touch panel may be used. Or, the input device 42 may recognize sound including voice.

In the robot 2, the robot arm 20, the base 21, and the force detection unit 5 have the following position relationship. As below, a position relationship among the first axis O1, a center line S2, a center line S21 (first center line) of the base 21, the center line S5 (second center line) of the force detection unit 5 will be explained using FIG. 5.

As described above, the first axis O1 is a rotation axis of the first arm 22 coupled to the base 21. Further, the first axis O1 is parallel to the z-axis.

The center line S2 passes through a center of gravity G of the robot 2 and is parallel to the z-axis, i.e., the first axis O1. The position of the center of gravity G of the robot 2 is displaced according to the posture of the robot arm 20, and the center line S2 is displaced within an area A2 shown in FIG. 5. The area A2 is a space having widths in the x-axis directions and the y-axis directions.

As below, the explanation will be made on the assumption that the center of gravity G of the robot 2 refers to a center of gravity when the robot arm 20 is located in a home position. As shown in FIG. 1, the home position refers to a state in which the first arm 22 and the second arm 23 extend along the y-axis at rest. In other words, the home position refers to a state in which the third axis O3 is farthest from the first axis O1 and a pipe 8 shown in FIG. 1 appears as a linear shape as seen from the z-axis directions.

The center line S21 of the base 21 is a line passing through the center of the base 21 and being parallel to the first axis O1. In the embodiment, the center of the base 21 refers to a center of gravity in a projected shape formed by projection of the base 21 from the z-axis directions. That is, the center refers to the geometric center of the projected shape formed by projection of the base 21 from the z-axis directions.

As described above, the center line S5 of the force detection unit 5 refers to a line passing through the center of the circle on which the respective elements 54 are placed and being parallel to the z-axis, i.e., the first axis O1.

In the present disclosure, as shown in FIG. 5, the center line S5 is located closer to the first axis O1 than the center line S21. That is, the center line S5 is closer to the first axis O1 than the center line S21. Thereby, the following advantages are obtained.

As described above, in the robot 2, the robot arm 20 is coupled to the position shifted from the center line S21 of the base 21. That is, the center line S21 of the base 21 and the first axis O1 are located in different positions. Accordingly, the center of gravity G of the robot 2 is located in a position shifted from the center line S21 of the base 21. Therefore, in the force detection unit 5, inertial moment shown by an arrow in FIG. 5 is generated due to the weight of the robot 2 itself. As a result, a force is constantly applied to the force detection unit 5 by the influence of the inertial moment.

In a case where the force constantly applied to the force detection unit 5 is a force F1, when an external force is not applied to the third arm 24, the force detection unit 5 detects the force F1. When an external force in the direction of the arrow in FIG. 5 is applied to the third arm 24, a force F2 is applied to the force detection unit 5 by the influence thereof. At the time, the force detection unit 5 detects a force F3 as a force (F1-F2). Then, the control apparatus 1 controls the robot arm 20 based on a difference between the force F3 and the force F1 detected by the force detection unit 5, i.e., an amount of change of the force detected by the force detection unit 5.

When the force F1 is larger than the force F2, the amount of change is smaller. Accordingly, for example, when the force F2 is smaller, the accurate detection of the force F2 may be difficult.

Accordingly, as described above, in the present disclosure, the force detection unit 5 is placed so that the center line S5 may be closer to the first axis O1 than the center line S21. Thereby, the distance between the center of gravity G of the robot 2 and the center line S5 of the force detection unit 5 may be made smaller than that in related art. Therefore, the force F1 constantly applied to the force detection unit 5 by the influence of the inertial moment as shown by the arrow in FIG. 5 may be made smaller. Thus, even when the amount of change of the force detected by the force detection unit 5 is larger relative to the force F1 and the force F2 is smaller, the force F2 may be accurately detected. According to the present disclosure, the detection accuracy of the force detection unit 5 may be improved in this way.

In the embodiment, the first axis O1 and the center line S5 as the second center line overlap as seen from the axial direction of the first axis O1. That is, the first axis O1 and the center line S5 coincide. Thereby, the inertial moment about the first axis O1 generated when the first arm 22 rotates may be detected more accurately.

When a separation distance between the center line S21 and the third axis O3 is L1, a separation distance between the center line S21 and the center line S5 is L2, a separation distance between the center line S5 and the center line S2 is L3, a separation distance between the center line S21 and the first axis O1 is L4, and a height from the force detection unit 5 to the center of gravity G is L5, L1 to L5 preferably satisfy the following relationships.

In the robot 2, L2/L1 preferably satisfies $0.01 \leq L2/L1 \leq 0.8$ and more preferably satisfies $0.05 \leq L2/L1 \leq 0.6$. Thereby, the detection accuracy of the force detection unit 5 may be effectively improved. When L2/L1 is too small, the center of gravity G shifts in a direction away from the force detection unit 5, the force F1 constantly applied to the force detection unit 5 tends to be too large, and the detection accuracy may be lower. On the other hand, when L2/L1 is too large, it is harder to place the base 21 on the force detection unit 5 with balance.

Further, in the robot 2, L2/L3 preferably satisfies $0.1 \leq L2/L3 \leq 6.0$ and more preferably satisfies $0.2 \leq L2/L3 \leq 4.0$. Thereby, the detection accuracy of the force detection unit 5 may be effectively improved. When L2/L3 is too small, the center of gravity G shifts in a direction away from the force detection unit 5, the force F1 constantly applied to the force detection unit 5 tends to be too large, and the detection accuracy may be lower. On the other hand, when L2/L3 is too large, it is harder to place the base 21 on the force detection unit 5 with balance.

Note that, in the embodiment, L2=L4 and the preferable numerical range of L4/L3 is the same as the above described numerical range of L2/L3.

Furthermore, in the robot 2, L2/L5 preferably satisfies $0.05 \leq L2/L5 \leq 3.0$ and more preferably satisfies $0.1 \leq L2/L5 \leq 1.0$. Thereby, the detection accuracy of the force detection unit 5 may be effectively improved. When L2/L5 is too small, the force F1 constantly applied to the force detection unit 5 tends to be too large, and the detection accuracy may be lower. On the other hand, when L2/L5 is too large, it is harder to place the base 21 on the force detection unit 5 with balance.

As described above, the robot 2 includes the base 21, the robot arm 20 having the first arm 22 coupled to the base 21 and rotating about the first axis O1, and the force detection unit 5 provided in the base 21 and detecting the force acting on the base 21 or the robot arm 20. Further, the first arm 22 is coupled to the base 21 in the position shifted from the center line S21 as the first center line passing through the center of the base 21 and being parallel to the first axis O1. The center line S5 as the second center line passing through the center of the force detection unit 5 and being parallel to the first axis O1 is closer to the first axis O1 than the center line S21 as the first center line. Thereby, the distance between the center of gravity G of the robot 2 and the center line S5 of the force detection unit 5 may be made smaller than that in related art. Therefore, the force F1 constantly applied to the force detection unit 5 by the influence of the inertial moment as shown by the arrow in FIG. 5 may be made smaller. Thus, even when the amount of change of the force detected by the force detection unit 5 is larger relative to the force F1 and the external force F2 is smaller, the external force F2 may be accurately detected. According to the present disclosure, the detection accuracy of the force detection unit 5 may be improved in this way.

Second Embodiment

Figure 6:
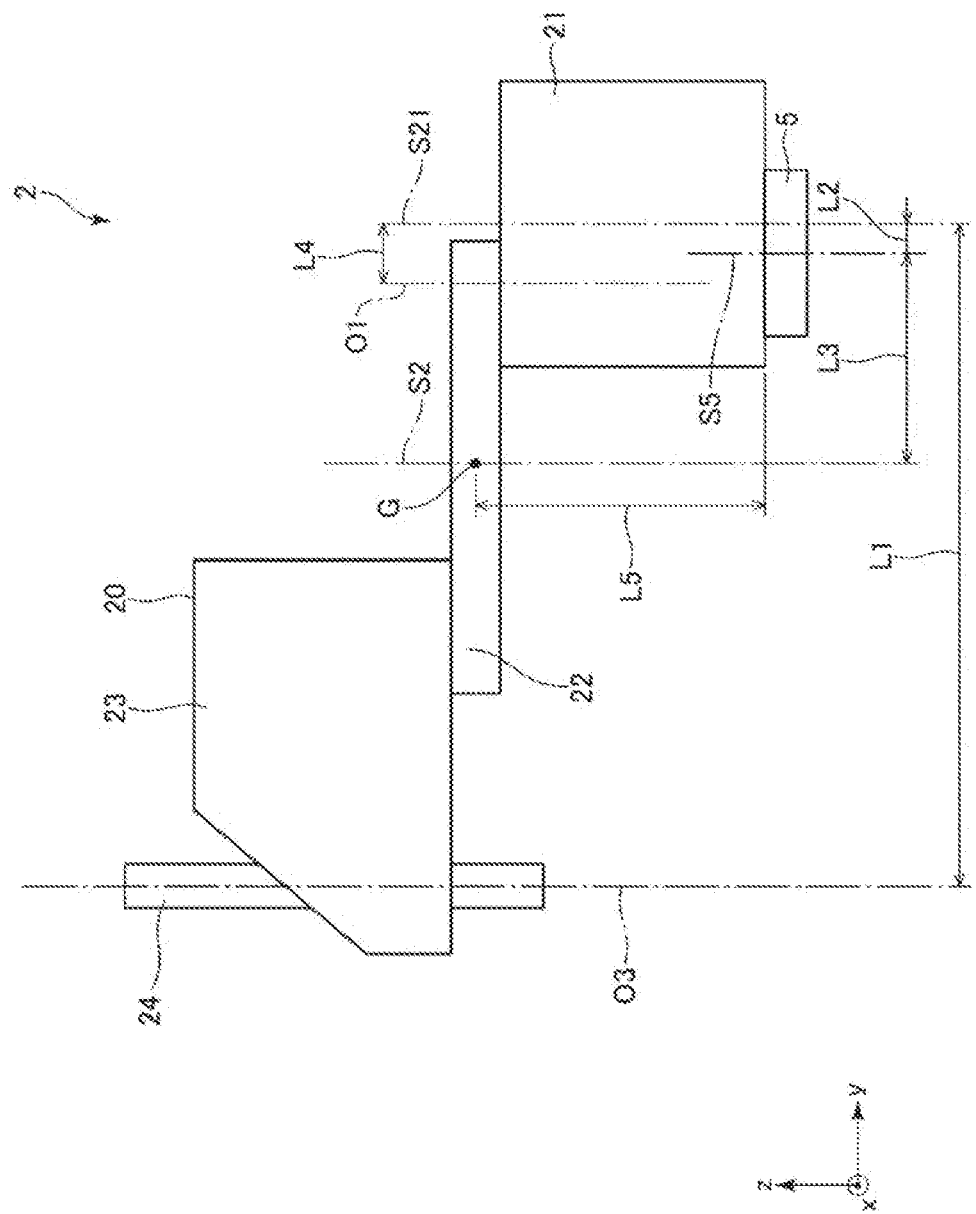
FIG. 6 is a schematic diagram of a second embodiment of the robot according to the present disclosure.

FIG. 6 is the schematic diagram of the second embodiment of the robot according to the present disclosure.

As below, the second embodiment of the robot according to the present disclosure will be explained with reference to FIG. 6, and the explanation will be made with a focus on the differences from the above described embodiment and the explanation of the same items will be omitted.

As shown in FIG. 6, in the embodiment, the center line S5 is located between the first axis O1 and the center line S21 as seen from the x-axis directions. That is, in a plan view of a plane containing the first axis O1 and the center line S21 as the first center line, the center line S5 as the second center line is located between the first axis O1 and the center line S21 as the first center line. Thereby, the effects of the present disclosure may be obtained and the force detection unit 5 may be placed closer to the center portion of the base 21 than that of the first embodiment and the force detection unit 5 may support the base 21 more stably.

Note that, in the embodiment, the first axis O1, the center line S5, and the center line S21 are located on the same plane, however, not limited thereto, these are not necessarily located on the same plane.

Third Embodiment

Figure 7:
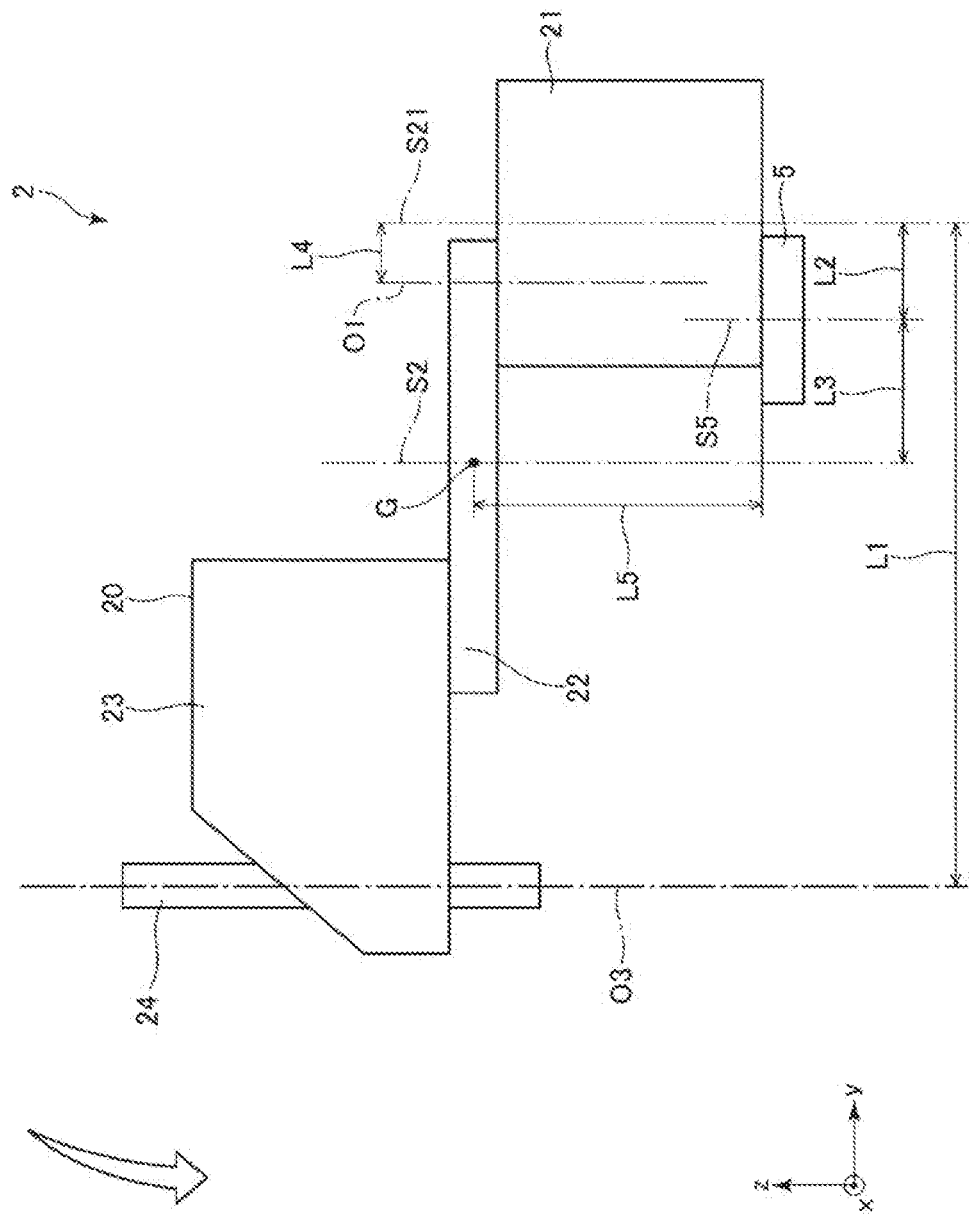
FIG. 7 is a schematic diagram of a third embodiment of the robot according to the present disclosure.

FIG. 7 is the schematic diagram of the third embodiment of the robot according to the present disclosure.

As below, the third embodiment of the robot according to the present disclosure will be explained with reference to FIG. 7, and the explanation will be made with a focus on the differences from the above described embodiments and the explanation of the same items will be omitted.

As shown in FIG. 7, in the embodiment, the center line S5 is located between the center line S2 and the first axis O1 as seen from the x-axis directions. That is, in the plan view of the plane containing the first axis O1 and the center line S21 as the first center line, the center line S5 as the second center line passes through the center of gravity G of the robot 2 and is located between the center line S2 as the line parallel to the first axis O1 and the first axis O1. Thereby, the effects of the present disclosure may be obtained and the force F1 constantly applied to the force detection unit 5 by the influence of the inertial moment as shown by an arrow in FIG. 7 may be made smaller because the center line S5 is closer to the center line S2 than those in the above described respective embodiments.

Note that, in the embodiment, the first axis O1, the center line S5, and the center line S21 are located on the same plane, however, not limited thereto, these are not necessarily located on the same plane.

As above, the robot according to the present disclosure is explained based on the illustrated embodiments, however, the present disclosure is not limited to those. The configurations of the respective parts may be replaced by arbitrary configurations having the same functions. Further, another arbitrary configuration may be added. Furthermore, the features of the respective embodiments may be combined.

In the above described embodiments, the number of rotation axes of the robot arm is three, however, the number is not limited to that in the present disclosure. The number of rotation axes of the robot arm may be e.g. two, four, or more. That is, in the above described embodiments, the number of arms is three, however, the number is not limited to that in the present disclosure. The number of arms may be e.g. two, four, or more.

What is claimed is:

1. A SCARA robot comprising:
a base;
a robot arm having a first arm coupled to the base and rotating about a first axis; and
a force detection device provided under the base and detecting a force acting on the base or the robot arm, wherein
the first arm is coupled to the base in a position shifted from a first center line passing through a center of the base and being parallel to the first axis, and
a second center line passing through a center of the force detection device and being parallel to the first axis is closer to the first axis than the first center line.

2. The robot according to claim 1, wherein
the first axis and the second center line overlap as seen from an axial direction of the first axis.

3. The robot according to claim 1, wherein
in a plan view of a plane containing the first axis and the first center line, the second center line is located between a line passing through a center of gravity of the robot and being parallel to the first axis and the first axis.

4. The robot according to claim 1, wherein
in a plan view of a plane containing the first axis and the first center line, the second center line is located between the first axis and the first center line.

5. The robot according to claim 3, wherein
the robot arm has the first arm, a second arm coupled to the first arm at an opposite side to the base and rotating about a second axis parallel to the first axis, and a third arm supported by the second arm and moving along an axial direction of the third axis in a position different from that of the second axis in parallel to the second axis.

6. The robot according to claim 5, wherein
$0.01 \leq L2/L1 \leq 0.8$, where a separation distance between the first center line and the third axis is L1 and a separation distance between the first center line and the second center line is L2.

* * * * *